ORAL BLOOD SUGAR LOWERING COMPOSITIONS
Edgar A. Ferguson, Jr., 150 Woodruff Ave.,
Brooklyn, N.Y.
No Drawing. Filed Apr. 6, 1962, Ser. No. 185,523
4 Claims. (Cl. 167—75)

The present invention relates to oral blood sugar lowering compositions, and more particularly to compositions which permit the oral administration of insulin so that the organism can successfully utilize carbohydrates and lower the blood sugar.

This application is a continuation-in-part of my copending application Serial No. 103,246, filed April 17, 1961, for "Oral Insulin Composition," now abandoned, which in turn is a continuation of application Serial No. 848,514, filed October 26, 1959, for "Oral Insulin Composition," now abandoned.

It is the insulin in the body which effects normal utilization of blood sugar and carbohydrates. Insulin is usually administered parenterally. It is well known that if insulin is taken orally it will have no effect whatsoever on the utilization of sugar by the body.

Those products which are administered orally for their blood sugar lowering effects are not insulin but are insulin-stimulating drugs. These drugs are not suitable for many individuals.

It is therefore a primary object of the present invention to provide an oral insulin composition, namely a composition which provides for the oral administration of insulin while having the same type of effect as that achieved by the parenteral administration of insulin, i.e., the administration of insulin by injection.

Other objects and advantages of the present invention will be apparent from a further reading of the specification and of the appended claims.

With the above, and other objects in view, the present invention mainly comprises an insulin composition comprising, as coactive ingredients, insulin, and the reaction product of an aliphatic aldehyde, such as formaldehyde or acetaldehyde with a primary aromatic amino compound. The product of the reaction of an aliphatic aldehyde with a primary aromatic amino compound may be considered as an aryl-substituted triazine. Thus, it may be considered that the composition of the present invention comprises insulin and an aryl-substituted triazine.

It has been discovered that the compositions of the present invention, namely a composition comprising insulin and the reaction product of an aliphatic aldehyde with a primary aromatic amino compound have the effect of markedly reducing blood sugar level in rabbits, when administered orally.

Likewise, the composition of the present invention when administered orally has the effect of lowering the blood sugar level, thereby proving that the composition is an effective oral insulin.

The basis of the present invention is the discovery that although insulin alone when administered orally will have no effect on the blood sugar, the administration of insulin orally in combination with the product obtained by the reaction of an aromatic amine with an aliphatic aldehyde will have the effect of reducing blood sugar levels.

The simplest aromatic amino-aldehyde product, and one which, due to its simplicity and ready availability, most useful for the purposes of the present invention, is the compound known as anhydroformaldehyde-aniline. This compound is made by reacting aniline with formaldehyde to give a kind of a gummy precipitate in the nature of a condensation product. The structure of anhydroformaldehyde-aniline is assumed to have triazine grouping. Anhydroformaldehyde-aniline is given the formula $(CH_2NC_6H_5)_3$. Structurally this substance has the following formula:

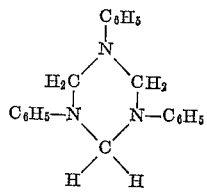

Other aromatic amino compounds can be substituted for the aniline. For example, a condensation product can be made from formaldehyde and: toluidene, sulfanilic acid (ortho or meta), para-amino benzene sulfonamide, ortho and meta amino phenols, and paraamino benzene sulfonic acid. All of these substances have been condensed with formaldehyde and the condensation product admixed with insulin to give compositions which reduce blood sugar levels when administered orally. It is believed that the essential conditions for the formation of a condensation product suitable for combining with insulin are as follows: the aromatic amino compound must contain a primary amino group reactive with the oxygen atom of the aldehyde. If reactivity of the amino hydrogens is blocked by other substituents then, of course, no reaction with the formaldehyde will occur. Consequently, any aromatic amino compound containing two amino hydrogens reactive with formaldehyde to form a condensation product will be operative, subject, of course, to toxicity characteristics in the resulting condensation product. Obviously, a condensation product should not be admixed with the insulin if the condensation product is toxic.

Likewise, any reactive aliphatic aldehyde can be used for the formation of the condensation product. Formaldehyde is the cheapest and most available but the present invention is not to be limited to reaction products made from formaldehyde. Acetaldehyde is also readily available and relatively cheap and will also form reaction products which can be used with the insulin.

It is understood that the foregoing discussion of the theory of formation of the composition of the present invention is by way of explanation and is not intended to limit the scope of the invention as described in the specification and appended claims.

The compositions of the present invention may be prepared by admixing insulin with that reaction product made from an aliphatic aldehyde and an aromatic amino compound containing a primary amino radical reactive with the aldehyde. Although in the commercial practice of the present invention it is preferred to use aniline as the aromatic amine, those amino compounds mentioned above, together with corresponding naphthalene derivatives can be used. Numerous other aromatic amino compounds may be used and are meant to be comprehended within the scope of the present invention. But for all practical purposes aniline is the best aromatic amino compound to use. In the interests of brevity the invention will be described in greater detail with reference to the use of anhydroformaldehyde-aniline.

The insulin composition can be prepared in at least two different ways. In the first method, anhydroformaldehyde-aniline condensation product is prepared and then this product is added to any convenient aqueous solution of insulin. Although the anhydroformaldehyde-aniline does not dissolve in the aqueous insulin solution the resulting mixture can be readily administered by mouth. Alternatively, the aqueous insulin-anhydroformaldehyde-aniline mixture can be dried to get a dry product which can be capsuled. The easiest way, however, is to simply add the anhydroformaldehyde-aniline to the aqueous insulin solution and administer in this form.

The proportion of the aryl-substituted triazine to the insulin in the compositions of the present invention may vary over wide limits. The minimum amount of the aryl-substituted triazine should be that amount which is sufficient to permit oral administration of the insulin without destruction of the effect of the insulin on the blood sugar, and the maximum amount of the aryl-substituted triazine with relation to the amount of insulin is limited only by practical considerations of economy and toxicity. In other words there is no need to use substantially more of the aryl-substituted triazine than that which will accomplish the result desired according to the present invention, and certainly the amount of aryl-substituted triazine which is used should not be so great as to cause any undesirable side-effects or toxic manifestations. In general, as little as 0.025 mg. of the aryl-substituted triazine per insulin unit is sufficient to achieve protection of the insulin when the same is administered orally in the composition of the present invention. Preferably the amount of aryl-substituted triazine per insulin unit for the purposes of the present invention should be between .01 mg. to 1 mg. of the aryl-substituted triazine per insulin unit.

One suitable composition according to the present invention is 60 milligrams of the anhydroformaldehyde-aniline and 10 cc. of an aqueous solution of zinc insulin crystals, the solution having a pH of about 2.4 to 2.6. At this pH the insulin remains in solution. If the pH is raised to between 5 and 6 the insulin can be caused to precipitate, this acid concentration being approximately the iso-electric point of the insulin, whereupon a precipitate composed of insulin and the anhydroformaldehyde-aniline is obtained. This precipitate can be separated from the mother liquor and administered as such. The aqueous solution of insulin just described can be of varying strength, such as one having 100 rabbit units per ml., 200 rabbit units per ml., and the like.

The following examples are given to further illustrate the present invention. The scope of the invention is not, however, meant to be limited to the specific examples.

*Example 1*

60 mg. of the anhydroformaldehyde-aniline product are added to 10 cc. of an aqueous solution of insulin having 100 rabbit units and the mixture orally administered to a rabbit. In about an hour the rabbit suffers severe insulin shock, thus indicating that the orally administered insulin is functioning in the same manner as insulin injected hypodermically.

The anhydroformaldehyde-aniline alone has no effect on the rabbit, neither does the same quantity of insulin when given by mouth or actually intubated into the stomach of the rabbit. Large numbers of experiments with rabbits have shown conclusively that the combination of the insulin with the anhydroformaldehyde-aniline is sufficient to put the rabbit into insulin shock whereas neither substance used alone shows any effect.

The anhydroformaldehyde-aniline can be made very easily. For example, to 0.2 gram of aniline hydrochloride is added about ½ cc. of 10% caustic soda. This is enough to give a pH value of about 5.5 and most all of the aniline hydrochloride is thus converted to free aniline. To the mixture is then added 0.15 cc. of 40% formaldehyde solution. A precipitate forms at once and this precipitate is centrifuged off and dried. 60 mg. of anhydroformaldehyde-aniline condensation products are thus obtained.

When testing the efficacy of the insulin compositions of the present invention on rabbits the starvation blood sugar which on the average is about 120 to 140 mg. is first determined. The insulin composition is then administered and after about 1½ hours the blood sugar is again determined. In all cases the blood sugar decreases rapidly to values under 100 and frequently as low as 46. When the blood sugar levels are very low the rabbit undergoes insulin shock and may expire. These rabbit tests indicate conclusively that when anhydroformaldehyde-aniline is admixed with insulin the resulting product can be administered orally and will lower the blood sugar level of rabbits in much the same way as ordinary insulin taken hypodermically.

Instead of first preparing the anhydroformaldehyde-aniline and then admixing it with an insulin solution the anhydroformaldehyde-aniline can be prepared in the presence of insulin. Broadly speaking, this process simply entails the addition of formaldehyde to aniline in the presence of insulin. For example, dilute caustic soda is added to an aqueous solution of aniline hydrochloride at a pH of about 5.5. Insulin is then added to this aqueous solution, either as crystals or as an aqueous solution of the insulin, and the formaldehyde is added. The net result is a precipitation of the anhydroformaldehyde-aniline reaction product, together with the insulin, provided the pH of the mother liquor is at the iso-electric point for the insulin. If the precipitation of the condensation product occurs at a pH of about 5 to 6 then the insulin precipitates along with the condensation product. Instead of using aniline it is possible to use toluidene, or toluidene hydrochloride, or any other aromatic amino compound.

As stated, the relative proportions of insulin and amine-aldehyde condensation product can vary over wide limits. As much as 10 parts by weight of the amine aldehyde condensation product can be admixed with one part by weight of insulin crystals preferably dissolved in water at the appropriate pH. The concentration, or effective strength of the insulin expressed in rabbit units can also vary over wide limits.

When preparing anhydroformaldehyde-aniline or other amino-aldehyde condensation products it is advantageous to start with water-soluble salts of the amines since they are readily soluble in water and so is the formaldehyde. One could, of course, start with the free amine itself and add formaldehyde or another reactive aldehyde thereto.

*Example 2*

Dissolve 1.5 grams of aniline hydrochloride in approximately 50 ml. of water and 10 ml. methanol. Add 25 ml. of formalin (containing 40% oxymethylene by weight together with 10% methanol by weight). Stir, and allow to stand at room temperature for approximately ½ hr. until the precipitate has settled. Pour off the supernating fluid and wash the precipitate three times with distilled water. Dry and powder the reaction product (anhydroformaldehyde-aniline). Mix the anhydroformaldehydeaniline with the solvent (water buffered at pH 2.6) for insulin in accordance with proportions which have been previously determined. Insulin is added to the insulin solvent in accordance with the indicated proportions. Make up the following proportions:

| Anhydroformaldehyde-aniline, mg.: | Insulin, units |
|---|---|
| 5 | 200 |
| 25 | 100 |
| 50 | 100 |
| 100 | 200 |
| 200 | 100 |
| 200 | 400 |
| 1000 | 250 |

These amounts or aliquots thereof are used by washing directly into the stomach through a gastric tube. There is no objection to the ingestion of the medication without the gastric tube if the subject is cooperative. Blood sugar examinations were taken at intervals following administration to demonstrate the blood sugar lowering effect of the composition.

Example 3

Dissolve 1.5 grams of aniline hydrochloride in approximately 50 ml. of water and 10 ml. methanol. Add 10 ml. formalin (containing 40% by weight together with 10% methanol by weight). Add insulin in the amount indicated on the table in Example 1.

Immediately adjust the pH to the maximum precipitation point of the insulin (approximately pH 3.4) with sodium hydroxide solution (approximately 1%). When maximum precipitation occurs centrifuge to bring both precipitates down at the same time. Separate the precipitate from the supernating fluid. Wash the precipitate with water buffered to the point of maximum precipitation of the insulin (isoelectric point). Combine the washings with the supernating fluid, readjust the pH and chill mixture to about 50° C. Centrifuge again and add the additional precipitate, after precipitation, to the original precipitate. The precipitate is then dried. It may be compressed into a tablet, filled into a capsule, or mixed with a liquid pharmaeutical carrier for oral administration. As a mixture with a liquid pharmaceutical carrier it may be washed through a gastric tube into the stomach of a subject. If the subject is cooperative the composition may be mixed with any pharmaceutical carrier and administered therewith.

Example 4

To 0.1 gram of aniline add 5 grams of water and 3 grams of ethyl alcohol. Stir vigorously to make a slurry. Add dropwise 0.25 ml. of formaldehyde (containing 40% oxymethylene and 10% methanol). Add 200 units (clinical) of insulin in a buffered solution (approximately pH 2.4). The amount of buffered solution is 5 ml.

This composition is used directly by washing through a gastric tube or by any other means convenient for the oral administration of the insulin.

Example 5

To 0.1 gram of aniline add 5 grams of water and 3 grams of ethyl alcohol. Stir vigorously to make a slurry. Add dropwise 0.25 ml. of formaldehyde (containing 40% oxymethylene and 10% methanol). Add 200 units (clinical) of insulin. The insulin is added dry in the form of a powder. The pH is then adjusted to the isoelectric point of insulin. The coprecipitate of insulin and the anhydroformaldehyde-aniline is separated and washed with buffered water and dried. This may be placed in any pharmaceutical carrier or in an enteric coated tablet. The enteric coating will to some extent regulate the time of the appearance of the blood sugar lowering effect of the composition when it is administered orally to a subject.

Example 6

Dissolve 1.5 grams of aniline hydrochloride in a minimum quantity of water (approximately 50 ml.) and 10 ml. methanol. Add 0.1 gram acetaldehyde. Stir, and allow to stand at room temperature for approximately ½ hr. until the precipitate has settled. Pour off the supernating fluid and wash the precipitate three times with distilled water. Dry and powder the reaction product (anhydroformaldehyde-aniline). Mix the anhydroformaldehyde with the solute for insulin in accordance with proportions which have been previously determined in the table in Example 1. These amounts of aliquots thereof are used by washing directly into the stomach through a gastric tube. There is no object to the ingestion of the medication without the gastric tube if the subject is cooperative. Blood sugar examinations were taken at intervals following administration to demonstrate the blood sugar lowering effect of the composition.

Example 7

To 0.1 gram sulfanilic acid add 15 grams of boiling water. Allow to cool and add dropwise 0.25 ml. of formaldehyde (containing 40% oxymethylene and 10% methanol). Add 200 units (clinical) of insulin in a buffered solution (approximately pH 2.4). The amount of buffered solution is 5 ml.

This composition is used directly by washing through a gastric tube or by any other means convenient for the oral administration of insulin. When administered to a subject the blood sugar lowering effect is demonstrated by taking blood samples at suitable intervals following administration to demonstrate the blood sugar lowering effect of the composition.

Example 8

To 0.1 gram sulfanilic acid add 15 grams boiling water. Allow to cool and add 0.01 gram acetaldehyde. Add 200 units (clinical) of insulin in a buffered solution (approximately pH 2.4). The amount of buffered solution is 5 ml.

This composition is used directly by washing through a gastric tube or by any other means convenient for the oral administration of the composition.

Example 9

To 0.1 gram o-toluidine add 5 ml. ethyl alcohol and 0.25 ml. of formaldehyde (containing 40% oxymethylene and 10% methanol). Add 200 units (clinical) of insulin in a buffered solution (approximately pH 2.4). The amount of buffered solution is 5 ml. This composition is used directly by washing through a gastric tube or by any other means convenient for the oral administration of the composition.

Example 10

To 0.1 gram o-toluidine add 0.01 gram acetaldehyde in 5 ml. ethyl alcohol and 200 units (clinical) of insulin in a buffered solution (approximately pH 2.4). The amount of buffered solution is 5 ml. This composition is used directly by washing through a gastric tube or by any other means convenient for the oral administration of the composition.

I believe that my invention can be described as an insulin composition containing insulin and the condensation reaction product of a primary aromatic amine and an aliphatic aldehyde. It might also be described as consisting of a mixture of insulin and an aryl-substituted triazine since it is understood that formaldehyde reacts with aromatic amines to form aryl-substituted triazines. But in view of the uncertain state of the nomenclature, as well as the uncertainties surrounding the actual structure of that compound formed when aromatic amines are reacted with formaldehyde I prefer to claim my invention with reference to both the condensation products and the triazines.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range or the equivalence of the following claims.

What is claimed as new and desired to be secured by Letters Patent is:

1. An oral blood sugar lowering composition containing insulin and anhydroformaldehyde-aniline in an amount sufficient to permit oral administration of the insulin while preventing destruction of the effect of the insulin on the blood sugar and below the toxicity level.

2. An oral blood sugar lowering composition containing insulin and anhydroformaldehyde-aniline in an amount of 0.025 mg. per unit of insulin.

3. A solution suitable for oral administration comprising an aqueous solution of insulin and anhydroformaldehyde-aniline in an amount sufficient to permit oral administration of the insulin while preventing destruction of the effect of the insulin on the blood sugar and below the toxicity level.

4. The method of lowering an animal's blood sugar which comprises orally administering to a host animal a composition comprising insulin and anhydroformaldehyde-aniline in an amount sufficient to permit oral administration of the insulin while preventing destruction of the effect of the insulin on the blood sugar and below the toxicity level.

References Cited by the Examiner
UNITED STATES PATENTS
2,358,807   9/44   Huppert _____ 167—75

OTHER REFERENCES
Hackh's Chemical Dictionary, 3rd ed., 1957, p. 58.

Hanzlik et al.: Endocrinology, vol. 28, pp. 368–374, March 1941.

Lasch: Drug and Cosmetic Industry, 67 (5), p. 691, November 1950.

Laskowski et al.: Science, 127:3306, pp. 1115–6, May 9, 1958.

Martin: Nature, 167 (4257), p. 904, Jan. 2, 1951.

LEWIS GOTTS, *Primary Examiner.*

FRANK CACCIAPAGLIA, JR., *Examiner.*